(12) United States Patent
Choi et al.

(10) Patent No.: US 12,467,966 B2
(45) Date of Patent: Nov. 11, 2025

(54) APPARATUS AND METHOD FOR DIAGNOSING INSULATION RESISTANCE MEASUREMENT CIRCUIT

(71) Applicant: LG Energy Solution, Ltd., Seoul (KR)

(72) Inventors: Jang-Hyeok Choi, Daejeon (KR); Gyu-Yeol Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 351 days.

(21) Appl. No.: 17/640,137

(22) PCT Filed: Aug. 20, 2020

(86) PCT No.: PCT/KR2020/011129
§ 371 (c)(1),
(2) Date: Mar. 3, 2022

(87) PCT Pub. No.: WO2021/045417
PCT Pub. Date: Mar. 11, 2021

(65) Prior Publication Data
US 2022/0299558 A1    Sep. 22, 2022

(30) Foreign Application Priority Data

Sep. 6, 2019   (KR) .................. 10-2019-0111050

(51) Int. Cl.
*G01R 31/12*    (2020.01)
*G01R 31/374*   (2019.01)
*G01R 31/3835*  (2019.01)

(52) U.S. Cl.
CPC .......... *G01R 31/12* (2013.01); *G01R 31/374* (2019.01); *G01R 31/3835* (2019.01)

(58) Field of Classification Search
None
See application file for complete search history.

(56) References Cited

U.S. PATENT DOCUMENTS

2009/0079434 A1    3/2009   Osawa et al.
2010/0246081 A1    9/2010   Yano et al.
2014/0084933 A1    3/2014   Jang et al.
(Continued)

FOREIGN PATENT DOCUMENTS

CN    202362420 U    8/2012
CN    103688183 A    3/2014
(Continued)

OTHER PUBLICATIONS

International Search Report for Application No. PCT/KR2020/011129 mailed Dec. 3, 2020, pp. 1-3.
(Continued)

*Primary Examiner* — Matthew G Marini
(74) *Attorney, Agent, or Firm* — Lerner David LLP

(57) ABSTRACT

An apparatus and method for diagnosing an insulation resistance measurement circuit, and more particularly an insulation resistance measurement circuit of a battery cell or a battery module. When diagnosing the state of the insulation resistance measurement circuit, since the voltage ratio based on the measured voltage value of the battery module and the estimated voltage value is used, there is an advantage that the state of the insulation resistance measurement circuit may be diagnosed more diversely and accurately.

12 Claims, 6 Drawing Sheets

(56) References Cited

U.S. PATENT DOCUMENTS

| | | | |
|---|---|---|---|
| 2014/0159908 A1* | 6/2014 | Hong | G01R 31/52 702/58 |
| 2015/0194922 A1 | 7/2015 | Sato et al. | |
| 2015/0380774 A1 | 12/2015 | Koike et al. | |
| 2016/0053765 A1 | 2/2016 | Schreiber et al. | |
| 2016/0252555 A1 | 9/2016 | Deumal Herraiz et al. | |
| 2017/0016951 A1 | 1/2017 | Sung et al. | |
| 2018/0062210 A1 | 3/2018 | Kim | |
| 2018/0188326 A1 | 7/2018 | Huh et al. | |
| 2019/0011504 A1 | 1/2019 | Kim et al. | |
| 2019/0047436 A1 | 2/2019 | Song | |
| 2020/0217893 A1 | 7/2020 | Song | |

FOREIGN PATENT DOCUMENTS

| | | |
|---|---|---|
| CN | 104220887 A | 12/2014 |
| CN | 104682523 A | 6/2015 |
| CN | 103439577 B | 2/2016 |
| CN | 106461733 A | 2/2017 |
| CN | 107076160 A | 8/2017 |
| CN | 108333548 A | 7/2018 |
| CN | 106325265 B | 1/2019 |
| CN | 105203958 B | 3/2019 |
| DE | 102014019603 A1 | 7/2015 |
| JP | 3424793 B2 | 7/2003 |
| JP | 2009081964 A | 4/2009 |
| JP | 2010239822 A | 10/2010 |
| JP | 2015-509605 A | 3/2015 |
| JP | 2016-65758 A | 4/2016 |
| JP | 2018048957 A | 3/2018 |
| JP | 2018-536855 A | 12/2018 |
| JP | 2019-508716 A | 3/2019 |
| JP | 2019512679 A | 5/2019 |
| KR | 20130110066 A | 10/2013 |
| KR | 20180024545 A | 3/2018 |
| KR | 20180051948 A | 5/2018 |
| KR | 20200058802 A | 5/2020 |
| WO | 2019117606 A1 | 6/2019 |

OTHER PUBLICATIONS

Tian, Sheng, "Electric Vehicle Power Battery Life Estimation and Energy Management System Research," Publish House of South China University of Technology, Oct. 31, 2018, pp. 1-14.

Extended European Search Report including Written Opinion for Application No. 20860919.8 dated Aug. 17, 2022, pp. 1-7.

* cited by examiner

APPARATUS AND METHOD FOR DIAGNOSING INSULATION RESISTANCE MEASUREMENT CIRCUIT

CROSS-REFERENCE TO RELATED APPLICATIONS

The present application is a national phase entry under 35 U.S.C. § 371 of International Application No. PCT/KR2020/011129 filed Aug. 20, 2020, published in Korean, which claims priority from Korean Patent Application No. 10-2019-0111050 filed Sep. 6, 2019, all of which are incorporated herein by reference.

TECHNICAL FIELD

The present disclosure relates to an apparatus and method for diagnosing an insulation resistance measurement circuit, and more particularly, to an apparatus and method for diagnosing an insulation resistance measurement circuit, which diagnoses an insulation resistance measurement circuit of a battery cell or a battery module.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-discharging rate and high energy density.

Meanwhile, in some cases, the secondary battery is used as a single secondary battery, but in many cases, a plurality of secondary batteries are connected in series and/or in parallel to provide a high-voltage and/or large-capacity energy storage system, and the plurality of secondary batteries are used in the form of a battery pack including a battery management system that controls the charging and discharging operation of the secondary batteries therein.

It is very important to maintain the insulation state of the energy storage system using the high-voltage, large-capacity secondary batteries. If the insulation state of the battery is not maintained, a leakage current may be generated to cause various problems. Specifically, due to the leakage current, not only the life of the battery may be shortened, but also a malfunction of electrical equipment connected to the battery may be caused and a safety accident such as an electric shock may occur.

To prevent the leakage current from being generated, it is required to monitor an insulation resistor of the battery.

Seeing Patent Literature 1, a device for diagnosing an insulation resistance measurement circuit is disclosed, and a state of the insulation resistance measurement circuit is diagnosed while turning on or off a verification switch connected in series with a verification resistor. In particular, Patent Literature 1 discloses a configuration for diagnosing a state of the insulation resistance measurement circuit by comparing a measured voltage with a reference voltage while turning on or off a plurality of verification switches, respectively.

If the voltage is measured while respectively turning on or off a plurality of verification switches as described above, a verification switch must be provided to each of the plurality of verification resistors. In addition, since the plurality of verification switches are controlled one by one to a turn-on or turn-off state, a considerable amount of time is required to diagnose the state of the insulation resistance measurement circuit.

In particular, if only one of the plurality of verification switches is controlled to a turn-on state and the state of one corresponding insulation resistor is diagnosed, it is impossible to diagnose the state of the insulation resistance measurement circuit by comprehensively considering the states of all resistors included in the insulation resistance measurement circuit.

(Patent Literature 1) KR 10-2018-0051948 A

SUMMARY

Technical Problem

The present disclosure is designed to solve the problems of the related art, and therefore the present disclosure is directed to providing an apparatus and method for diagnosing an insulation resistance measurement circuit, which may effectively diagnose various states of the insulation resistance measurement circuit based on a measured voltage value and an estimated voltage value of a battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect, the present disclosure may provide an apparatus for diagnosing an insulation resistance measurement circuit, comprising: a voltage sensor configured to measure a voltage of a battery module having at least one battery cell; a first diagnosing circuit connected to a positive electrode terminal of the battery module and configured to include a plurality of first diagnosis resistors and a first switch; a second diagnosing circuit connected to a negative electrode terminal of the battery module and configured to include a plurality of second diagnosis resistors, a second switch and a power supply; and a controller configured to calculate an estimated voltage value of the battery module based on a first voltage value calculated based on a signal received from the first diagnosing circuit and a second voltage value calculated based on a signal received from the second diagnosing circuit, calculate a voltage ratio between the calculated estimated voltage value and the voltage of the battery module measured by the voltage sensor, compare the calculated voltage ratio to a reference ratio, and diagnose a state of the insulation resistance measurement circuit of the battery module according to the comparison of the calculated voltage ratio to the reference ratio.

The plurality of first diagnosis resistors may include a first resistor, a second resistor and a third resistor connected in series between the positive electrode terminal of the battery module and the controller; and a fourth resistor having a first end connected to a node between the second resistor and the third resistor and a second end connected to a first ground.

The first switch may be connected in series between the first resistor and the second resistor.

The plurality of second diagnosis resistors may include a sixth resistor, a seventh resistor and an eighth resistor connected in series between the negative electrode terminal of the battery module and the control unit; and a ninth resistor having a first end connected to a node between the seventh resistor and the eighth resistor and a second end connected to the power supply unit.

The second switch may be connected in series between the sixth resistor and the seventh resistor.

The power supply may have a first end connected to the ninth resistor and a second end connected to the ground.

The first diagnosing circuit may further include a first capacitor connected in series between the fourth resistor and the ground.

The plurality of first diagnosis resistors may further include a fifth resistor connected in parallel to the first capacitor.

The plurality of second diagnosis resistors may further include a tenth resistor positioned between the ninth resistor and the power supply and have a first end connected to the second end of the ninth resistor and a second end connected to the power supply.

The second diagnosing unit may further include a second capacitor having a first end connected to a node between the ninth resistor and the tenth resistor and a second end connected to the ground.

The controller may be configured to estimate a positive electrode voltage value of the battery module based on the first voltage value, a resistance of the plurality of first diagnosis resistors and a resistance of the first switch, estimate a negative electrode voltage value of the battery module based on a voltage value supplied from the power supply, the second voltage value, a resistance of the plurality of second diagnosis resistors and a resistance of the second switch, and calculate the estimated voltage value by adding the estimated positive electrode voltage value and the estimated negative electrode voltage value.

The voltage ratio may be calculated using.

$$ROV = \frac{Vp + Vn}{Bv}$$

wherein ROV is the voltage ratio, Bv is the voltage of the battery module measured by the voltage sensor, Vp is the estimated positive electrode voltage value, and Vn is the estimated negative electrode voltage value.

The controller may be configured to set the reference ratio as a predetermined ratio range, diagnose the state of the insulation resistance measurement circuit as a failure state when the voltage ratio is not within the predetermined ratio range, and output a diagnostic trouble code corresponding to the failure state.

The measuring unit may include a temperature sensor configured to measure a temperature of the battery module.

The controller may be configured to change the predetermined ratio range based on the temperature of the battery module measured by the temperature sensor.

The controller may be configured to increase a size of the predetermined ratio range in response to the measured temperature of the battery module being higher than an upper temperature limit, and decrease the size of the predetermined ratio range in response to the measured temperature of the battery module being lower than a lower temperature limit.

The controller may be configured to estimate a state of charge (SOC) of the battery module and change the predetermined ratio range based on the estimated SOC.

After outputting the diagnostic trouble code, the controller may be configured to send a turn-off command to a main switch positioned on a charging and discharging path of the battery module to block a connection of the battery module.

After outputting the diagnostic trouble code, the controller may be configured to send the turn-off command to the main switch only when receiving a main switch turn-off command from outside of the apparatus.

In another aspect, the present disclosure may provide a battery pack, comprising the apparatus of any of the embodiments of the present disclosure.

In still another aspect, the present disclosure may provide a method for diagnosing an insulation resistance measurement circuit, comprising: measuring a voltage of a battery module having at least one battery cell; calculating an estimated voltage value based on a first voltage value calculated based on a signal received from a first diagnosing unit and a second voltage value calculated based on a signal received from a second diagnosing unit; calculating a voltage ratio between the calculated estimated voltage value and the measured voltage of the battery module; comparing the calculated voltage ratio to a reference ratio; and diagnosing a state of the insulation resistance measurement circuit of the battery module according to the comparison result of the calculated voltage ratio to the reference ratio.

Advantageous Effects

According to an aspect of the present disclosure, since the state of the insulation resistance measurement circuit may be diagnosed based on the signal from which the noise component is removed, there is an advantage that the state of the insulation resistance measurement circuit may be more accurately diagnosed.

In addition, according to an aspect of the present disclosure, when diagnosing the state of the insulation resistance measurement circuit, since the voltage ratio based on the measured voltage value of the battery module and the estimated voltage value is used, there is an advantage that the state of the insulation resistance measurement circuit may be diagnosed more diversely and accurately.

In addition, according to an aspect of the present disclosure, since the reference ratio compared to the voltage ratio may be changed according to the state of the battery module, there is an advantage that the state of the insulation resistance measurement circuit may be diagnosed by reflecting the state of the battery module.

The effects of the present disclosure are not limited to the above, and other effects not mentioned herein will be clearly understood by those skilled in the art from the appended claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise. Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
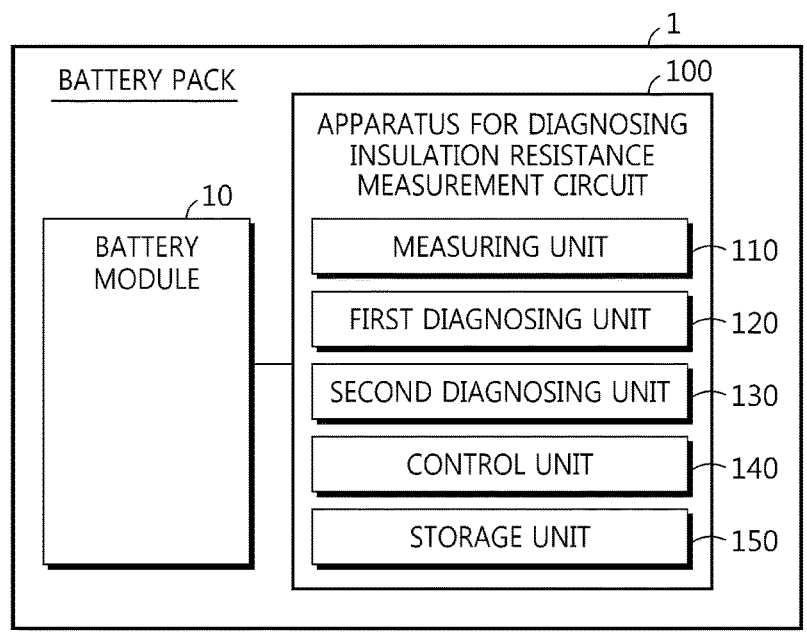
FIG. 1 is a diagram exemplarily showing a configuration of a battery pack including an apparatus for diagnosing an insulation resistance measurement circuit according to an embodiment of the present disclosure.

FIG. 1 is a diagram exemplarily showing a configuration of a battery pack 1 including an apparatus 100 for diagnosing an insulation resistance measurement circuit according to an embodiment of the present disclosure.

Referring to FIG. 1, the battery pack 1 may include a battery module 10 and an apparatus 100 for diagnosing an insulation resistance measurement circuit. In addition, the battery module 10 and the apparatus 100 for diagnosing an insulation resistance measurement circuit may be connected to each other inside the battery pack 1.

The battery module 10 may include at least one battery cell. For example, if a plurality of battery cells are included in the battery module 10, the plurality of battery cells may be connected to each other in series and/or in parallel.

Figure 2:
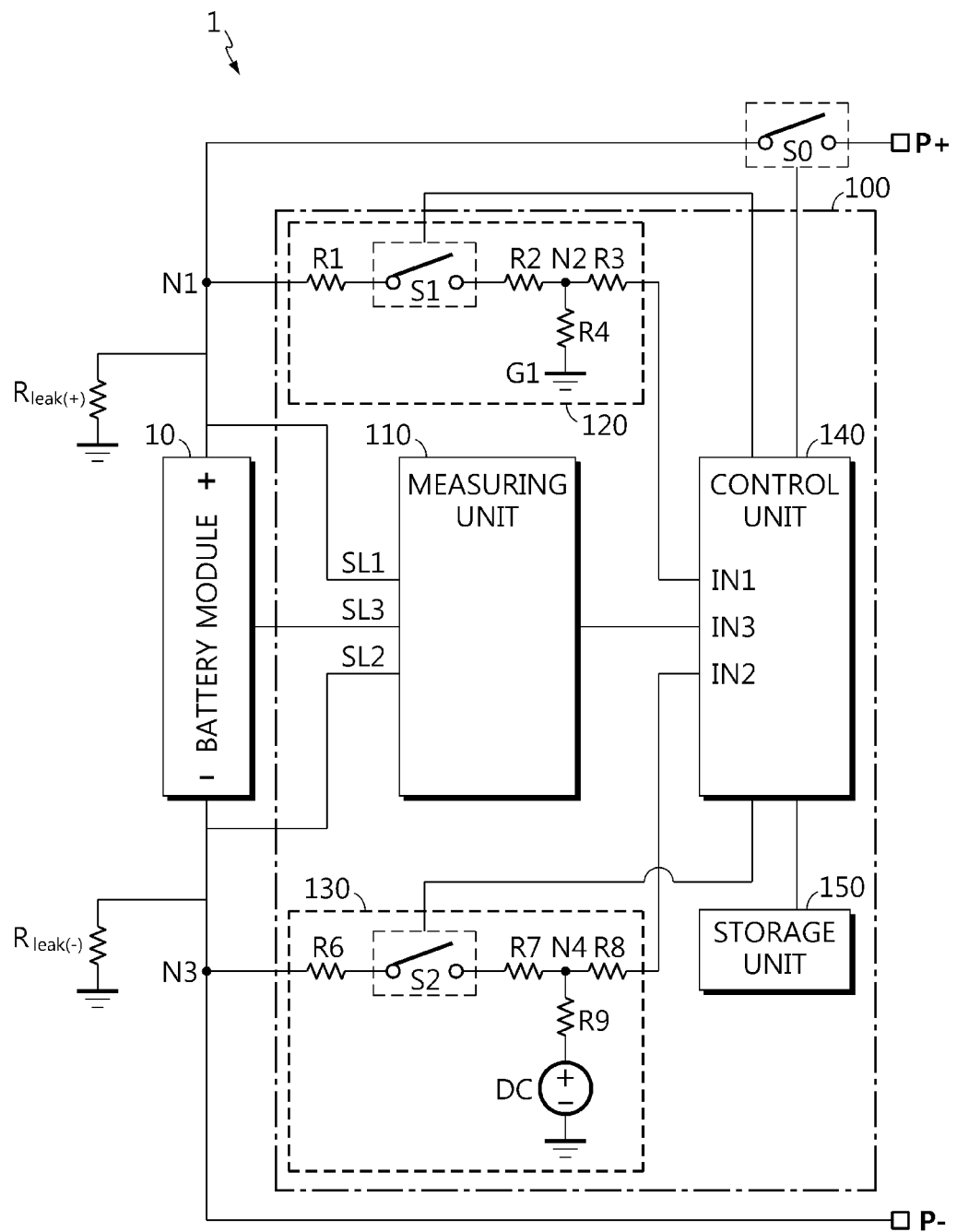
FIG. 2 is a diagram schematically showing the battery pack including the apparatus for diagnosing an insulation resistance measurement circuit according to an embodiment of the present disclosure.

FIG. 2 is a diagram schematically showing the battery pack 1 including the apparatus 100 for diagnosing an insulation resistance measurement circuit according to an embodiment of the present disclosure.

Referring to FIGS. 1 and 2, the apparatus 100 for diagnosing an insulation resistance measurement circuit may include a measuring unit 110, a first diagnosing unit 120, a second diagnosing unit 130, and a control unit 140. The measuring unit 110, the first diagnosing unit 120, the second diagnosing unit 130, and the control unit 140 may be connected to each other in a wired and/or wireless manner.

Meanwhile, referring to FIG. 2, it may be regarded that insulation resistors $R_{leak(+)}$, $R_{leak(-)}$ are provided between both terminals of the battery module 10 and the ground (for example, the chassis of a vehicle). In other words, the insulation resistors $R_{leak(+)}$, $R_{leak(-)}$ may be regarded as virtual resistor components corresponding to the insulation state of the battery module 10.

Specifically, a first insulation resistor $R_{leak(+)}$ may be connected to a positive electrode terminal (+) of the battery module 10, and a second insulation resistor $R_{leak(-)}$ may be connected to a negative electrode terminal (−) of the battery module 10. If the insulation state of the positive electrode terminal of the battery module 10 is well maintained, the insulation resistor $R_{leak(+)}$, $R_{leak(-)}$ will have a sufficiently large resistance. Conversely, if the insulation state of the battery module 10 is destroyed, the insulation resistors $R_{leak(+)}$, $R_{leak(-)}$ will have a very small resistance below an allowable value. The insulation resistors $R_{leak(+)}$, $R_{leak(-)}$ are measured through an insulation resistance measurement circuit, and based on the measured results, it may be determined whether the insulation resistors $R_{leak(+)}$, $R_{leak(-)}$ are destroyed.

In the present disclosure, the insulation resistance measurement circuit may include a first diagnosing unit 120 and a second diagnosing unit 130. Specifically, the first diagnosing unit 120 is a circuit for measuring the first insulation resistor $R_{leak(+)}$, and the second diagnosing unit 130 is a circuit for measuring the second insulation resistor $R_{leak(-)}$.

Therefore, the apparatus 100 for diagnosing an insulation resistance measurement circuit may diagnose the state of the insulation resistance measurement circuit by diagnosing the state of the first diagnosing unit 120 and the second diagnosing unit 130. Hereinafter, each component of the apparatus 100 for diagnosing an insulation resistance measurement circuit will be described in detail.

The measuring unit 110 may be configured to measure a voltage of the battery module 10 including at least one battery cell.

Preferably, the measuring unit 110 may measure the voltage of the battery module 10 by measuring voltages at both terminals of the battery module 10 and calculating a difference between the measured voltages at both terminals.

For example, in the embodiment of FIG. 2, a first sensing line SL1 and a second sensing line SL2 may be connected to the measuring unit 110. The measuring unit 110 may measure a voltage at the positive electrode terminal of the battery module 10 through the first sensing line SL1 and measure a voltage at the negative electrode terminal of the battery module 10 through the second sensing line SL2. That is, the measuring unit 110 may measure the voltages at both terminals of the battery module 10 through the first sensing line SL1 and the second sensing line SL2. In addition, the measuring unit 110 may measure the voltage of the battery module 10 based on a difference between the measured voltage at the positive electrode terminal and the measured voltage at the negative electrode terminal. In addition, if the battery module 10 includes a plurality of battery cells, the measuring unit 110 may measure the voltage of each battery cell included in the battery module 10.

The first diagnosing unit 120 may be configured to be connected to the positive electrode terminal (+) of the battery module 10.

Specifically, the first diagnosing unit 120 may be connected between the positive electrode terminal (+) of the battery module 10 and a positive electrode terminal (P+) of the battery pack 1.

For example, seeing the embodiment of FIG. 2, the first diagnosing unit 120 may be provided between the control unit 140 and a first node N1 between the positive electrode terminal (+) of the battery module 10 and the positive electrode terminal (P+) of the battery pack 1. In addition, the first diagnosing unit 120 may be connected to the first node N1 and the control unit 140.

In addition, the first diagnosing unit 120 may be configured to include a plurality of first diagnosis resistors.

Preferably, the first diagnosing unit 120 may include a plurality of diagnosis resistors for measuring the first insulation resistor $R_{leak(+)}$. For example, as shown in FIG. 2, the plurality of first diagnosis resistors may include a first resistor R1, a second resistor R2, a third resistor R3, and a fourth resistor R4.

The second diagnosing unit 130 may be configured to be connected to the negative electrode terminal (−) of the battery module 10.

Specifically, the second diagnosing unit 130 may be connected between the negative electrode terminal (−) of the battery module 10 and the negative electrode terminal (P−) of the battery pack 1.

For example, seeing the embodiment of FIG. 2, the second diagnosing unit 130 may be provided between the control unit 140 and a third node N3 between the negative electrode terminal (−) of the battery module 10 and the negative electrode terminal (P−) of the battery pack 1. In addition, the second diagnosing unit 130 may be connected to the third node N3 and the control unit 140.

In addition, the second diagnosing unit 130 may be configured to include a plurality of second diagnosis resistors and a power supply unit DC.

Preferably, the second diagnosing unit 130 may include a plurality of second diagnosis resistors for measuring the second insulation resistor $R_{leak(-)}$ and a power supply unit DC. For example, as shown in FIG. 2, the plurality of second diagnosis resistors may include a sixth resistor R6, a seventh resistor R7, an eighth resistor R8, and a ninth resistor R9.

Meanwhile, the power supply unit DC included in the second diagnosing unit 130 may be a unit that supplies power separately from the battery module 10. The power supply unit DC may supply a preset DC power such that the voltage value calculated by the control unit 140 is positive through the second diagnosing unit 130. For example, the power supply unit DC may supply 5V DC power.

The control unit 140 may be configured to calculate an estimated voltage value of the battery module 10 by using a first voltage value based on a signal received from the first diagnosing unit 120 and a second voltage value based on a signal received from the second diagnosing unit 130.

Specifically, the control unit 140 may calculate the first voltage value based on a signal received through the first diagnosing unit 120, and calculate the second voltage value based on a signal received through the second diagnosing unit 130. Here, the control unit 140 may include an analog-digital converter (ADC). The control unit 140 may convert an analog signal input through a first input terminal IN1 and a second input terminal IN2 into a digital signal through the ADC. In addition, the control unit 140 may calculate the first voltage value and the second voltage value based on the digital signal changed through the ADC included therein.

For example, referring to FIG. 2, the control unit 140 may separately include a first input terminal IN1 for receiving a signal from the first diagnosing unit 120 and a second input terminal IN2 for receiving a signal from the second diagnosing unit 130, separately. That is, because the control unit 140 includes the first input terminal IN1 and the second input terminal IN2 separately, it is possible to prevent an unexpected error by minimizing interference between the signal received from the first diagnosing unit 120 and the signal received from the second diagnosing unit 130. Therefore, the control unit 140 may measure the first voltage value and the second voltage value more accurately.

In addition, the control unit 140 may calculate the estimated voltage value of the battery module 10 based on the calculated first voltage value and the calculated second voltage value. Here, the estimated voltage value of the battery module 10 may be the voltage of the battery module 10 estimated by the control unit 140. That is, the control unit 140 may estimate a difference in voltages at both terminals of the battery module 10 by using the first voltage value and the second voltage value.

Also, the control unit 140 may be configured to calculate a voltage ratio between the calculated estimated voltage value and the measured voltage value of the battery module 10 measured by the measuring unit 110.

The control unit 140 may receive the measured voltage value of the battery module 10 measured by the measuring unit 110, apart from receiving the analog signals from the first diagnosing unit 120 and the second diagnosing unit 130. Here, the measured voltage value may be the voltage of the battery module 10 measured by the measuring unit 110 through the first sensing line SL1 and the second sensing line SL2. That is, the measured voltage value may be a difference between the voltages at both terminals of the battery module 10 measured by the measuring unit 110. In addition, the control unit 140 may calculate a ratio between the measured voltage value directly measured by the measuring unit 110 and the estimated voltage value based on the calculated voltage value.

For example, the control unit 140 may calculate the voltage ratio by calculating the ratio of the estimated voltage value to the measured voltage value.

In addition, the control unit 140 may be configured to diagnose a state of the insulation resistance measurement circuit according to the comparison result of the calculated voltage ratio and a reference ratio.

Preferably, the reference ratio may be set in advance. Here, the reference ratio is a ratio at which the state of the insulation resistance measurement circuit may be determined as a normal state. For example, the reference ratio may be preset by the control unit 140 or may be preset and input to the control unit.

The control unit 140 may determine whether the state of the insulation resistance measurement circuit is a normal state by comparing the calculated voltage ratio with the reference ratio.

For example, if a plurality of resistors and switches provided to the insulation resistance measurement circuit are in a normal state, the voltage ratio calculated by the control unit 140 may be a value close to the reference ratio. Alternatively, if the reference ratio is set as a ratio range, the voltage ratio calculated by the control unit 140 may be included in the reference ratio. In this case, the control unit 140 may determine the first voltage value and the second voltage value as voltage values that may be received when the insulation resistance measurement circuit is in a normal state. In addition, the control unit 140 may diagnose the state of the insulation resistance measurement circuit as a normal state.

Conversely, if the difference between the voltage ratio calculated by the control unit 140 and the reference ratio is large, the control unit 140 may diagnose that the insulation resistance measurement circuit is not in a normal state.

The apparatus 100 for diagnosing an insulation resistance measurement circuit according to the present disclosure does not diagnose the state of the insulation resistance measurement circuit using only the estimated voltage value, but may diagnose the condition of the insulation resistance measurement circuit based on the voltage ratio between the estimated voltage value and the measured voltage value. Therefore, the state of the insulation resistance measurement circuit may be accurately diagnosed when the resistors included therein are not only in an open circuit state but also in a short circuit state.

Here, the control unit 400 provided to the apparatus 100 for diagnosing an insulation resistance measurement circuit may optionally include a processor, an application-specific integrated circuit (ASIC), another chipset, a logic circuit, a register, a communication modem, and a data processing device, and the like, known in the art to execute various control logics performed in the present disclosure. In addition, when the control logic is implemented in software, the control unit 103 may be implemented as a set of program modules. At this time, the program module may be stored in a memory and executed by the processor. The memory may be provided in or out of the processor, and may be connected to the processor by various well-known means.

Also, referring to FIGS. 1 and 2, the apparatus 100 for diagnosing an insulation resistance measurement circuit according to an embodiment of the present disclosure may further include a storage unit 150. The storage unit 150 may store programs and data necessary for the control unit 140 to diagnose the insulation resistance measurement circuit. That is, the storage unit 150 may store data and program required for each component of the apparatus 100 for diagnosing an insulation resistance measurement circuit according to an embodiment of the present disclosure to perform operations and functions, or data generated in the process of performing operations and functions. The storage unit 150 is not specially limited in its kind as long as it is an information storage means known in the art as being capable of recording, erasing, updating and reading data. As an example, the information storage means may include random access memory (RAM), flash memory, read-only memory (ROM), electronically erasable programmable read-only memory (EEPROM), registers, and the like. In addition, the storage unit 150 may store program codes in which processes executable by the control unit 140 are defined.

Referring to FIG. 2, the plurality of first diagnosis resistors may include a first resistor R1, a second resistor R2, a third resistor R3 and a fourth resistor R4. Here, the first resistor R1, the second resistor R2 and the fourth resistor R4 may be distribution resistors to reduce the amount of current input to the first input terminal IN1 of the control unit 140, and the third resistor R3 may be a current limiting resistor to reduce the amount of current input to the first input terminal IN1 of the control unit 140 via the second node N2.

Specifically, the plurality of first diagnosis resistors may include a first resistor R1, a second resistor R2 and a third resistor R3 connected in series between the positive electrode terminal (+) of the battery module 10 and the control unit 140. In addition, the plurality of first diagnosis resistors may include a fourth resistor R4 having one end connected to a node between the second resistor R2 and the third resistor R3 and the other end connected to a first ground G1.

For example, referring to FIG. 2, one end of the first resistor R1 may be connected to the first node N1 between the positive electrode terminal (+) of the battery module 10 and the positive electrode terminal (P+) of the battery pack 1. That is, the first diagnosing unit 120 may be connected in parallel to a main charging and discharging path of the battery module 10. Here, the main charging and discharging path may be a high current path to which the positive electrode terminal (P+) of the battery pack 1, the battery module 10, and the negative electrode terminal (P-) of the battery pack 1 are connected.

In addition, one end of the second resistor R2 may be connected to the other end of the first resistor R1, one end of the third resistor R3 may be connected to the other end of the second resistor R2, and the other end of the third resistor R3 may be connected to the first input terminal IN1 of the control unit 140. Accordingly, the control unit 140 may receive the first voltage value dropped by the first diagnosing unit 120 through the first input terminal IN1.

In addition, a first switch S1 is a switching element that turns on/off the connection state of the first diagnosing unit 120, and may be configured to be connected in series between the first resistor R1 and the second resistor R2. The control unit 140 may send a control command to the first switch S1 to control the operation state of the first switch S1 to a turn-on state or a turn-off state.

Further, referring to FIG. 2, the plurality of second diagnosis resistors may include a sixth resistor R6, a seventh resistor R7, an eighth resistor R8 and a ninth resistor R9. Here, the sixth resistor R6, the seventh resistor R7 and the ninth resistor R9 are distribution resistors to reduce the amount of current input to the second input terminal IN2 of the control unit 140. Also, the ninth resistor R9 may be a pull-up resistor. The eighth resistor R8 may be a current limiting resistor to reduce the amount of current input to the second input terminal IN2 of the control unit 140 via a fourth node N4.

Specifically, the plurality of second diagnosis resistors may include a sixth resistor R6, a seventh resistor R7 and an eighth resistor R8 connected in series between the negative electrode terminal (-) of the battery module 10 and the control unit 140. In addition, the plurality of second diagnosis resistors may include a ninth resistor R9 having one end connected to the fourth node N4 between the seventh resistor R7 and the eighth resistor R8 and the other end connected to the power supply unit DC.

For example, referring to FIG. 2, one end of the sixth resistor R6 may be connected to a third node N3 between the negative electrode terminal (−) of the battery module 10 and the negative electrode terminal (P−) of the battery pack 1. That is, the second diagnosing unit 130 may be connected in parallel to the main charging and discharging path of the battery module 10.

In addition, one end of the seventh resistor R7 may be connected to the other end of the sixth resistor R6, one end of the eighth resistor R8 may be connected to the other end of the seventh resistor R7, and the other end of the eighth resistor R8 may be connected to the second input terminal IN2 of the control unit 140. Accordingly, the control unit 140 may receive the second voltage value dropped by the second diagnosing unit 130 through the second input terminal IN2.

In addition, the second switch S2 is a switching element that turns on/off the connection state of the second diagnosing unit 130, and may be configured to be connected in series between the sixth resistor R6 and the seventh resistor R7. The control unit 140 may send a control command to the second switch S2 to control the operation state of the second switch S2 to a turn-on state or a turn-off state.

Also, the power supply unit DC may be configured such that its one end is connected to the ninth resistor R9 and the other end is connected to the ground. The power supply unit DC is an element that applies a DC power, and may apply, for example, 5V DC power to the second diagnosing unit 130. Therefore, the second voltage value calculated at the second input terminal IN2 of the control unit 140 may be calculated as a positive number.

The apparatus 100 for diagnosing an insulation resistance measurement circuit according to the present disclosure may calculate the estimated voltage value through the calculated first voltage value and the calculated second voltage value. Accordingly, there is an advantage in that the accuracy of calculating the estimated voltage value is improved, and the insulation resistance measurement circuit may be diagnosed more accurately based on the estimated voltage value.

Figure 3:
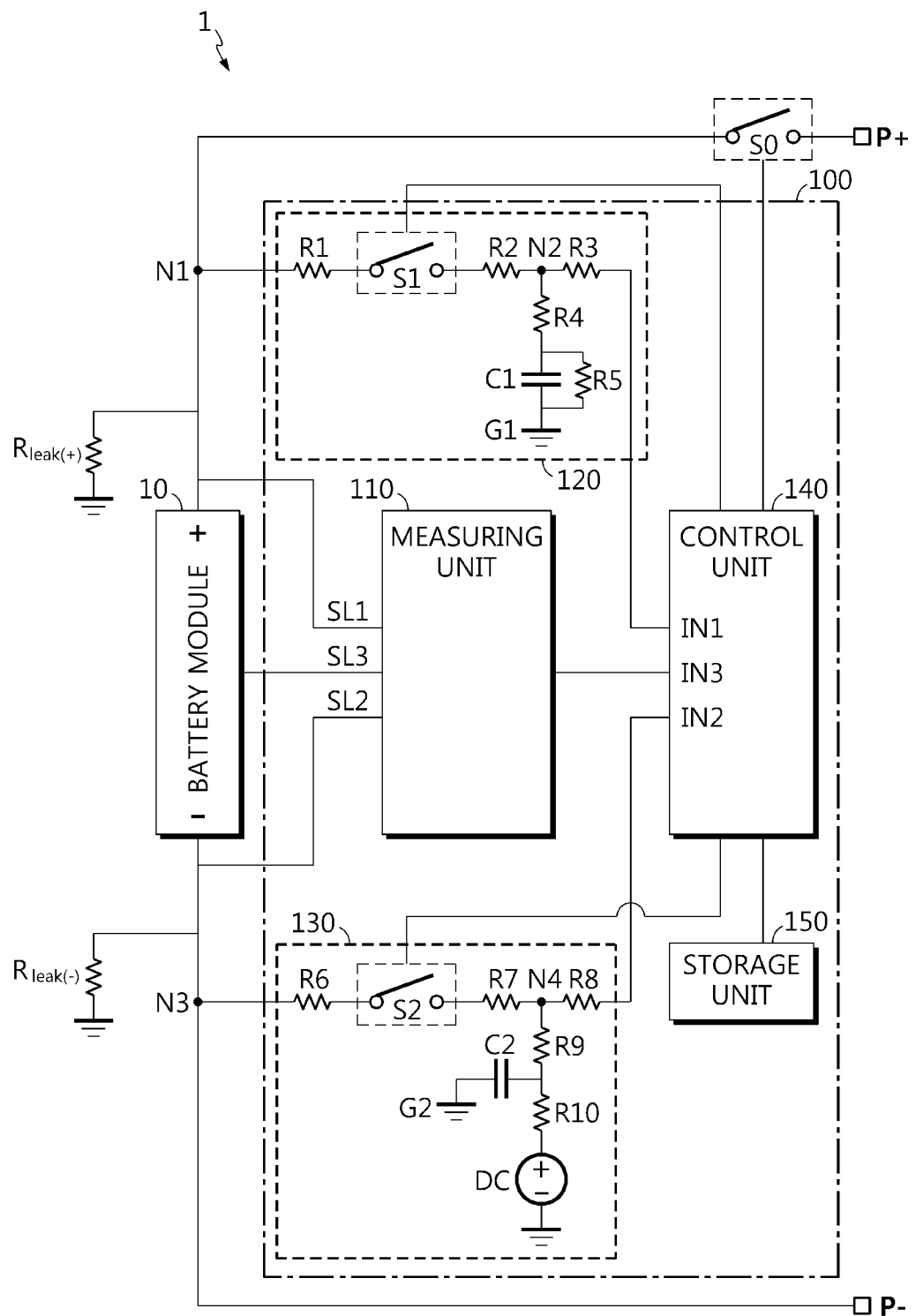
FIG. 3 is a diagram schematically showing a battery pack including an apparatus for diagnosing an insulation resistance measurement circuit according to another embodiment of the present disclosure.

FIG. 3 is a diagram schematically showing a battery pack 1 including an apparatus 100 for diagnosing an insulation resistance measurement circuit according to another embodiment of the present disclosure.

The first diagnosing unit 120 may further include a first capacitor C1 connected in series between the fourth resistor R4 and the first ground G1. Here, the first capacitor C1 is a bypass filter for removing noise, and may remove noise included in a signal flowing to the first input terminal IN1 of the control unit 140 through the first diagnosing unit 120. That is, the noise passing through the first capacitor C1 may flow to the first ground G1.

For example, referring to FIG. 3, one end of the first capacitor C1 may be connected to the other end of the fourth resistor R4, and the other end may be connected to the first ground G1. In addition, the plurality of first diagnosis resistors may further include a fifth resistor R5 connected in parallel to the first capacitor C1. One end of the fifth resistor R5 may be connected between the other end of the fourth resistor R4 and one end of the first capacitor C1, and the other end thereof may be connected to the first ground G1. Preferably, the first capacitor C1 may constitute a low pass filter. That is, the first capacitor C1 may filter high-frequency components included in the current flowing to the first input terminal IN1 of the control unit 140 through the first diagnosing unit 120 so that the control unit 140 may receive a signal from which noise is removed.

In addition, the plurality of second diagnosis resistors may further include a tenth resistor R10 provided between the ninth resistor R9 and the power supply unit DC. That is, the plurality of second diagnosis resistors may further include a tenth resistor R10 having one end connected to the other end of the ninth resistor R9 and the other end connected to the power supply unit DC. Here, the tenth resistor R10 may be a pull-up resistor.

The second diagnosing unit 130 may further include a second capacitor C2 having one end connected to a node between the ninth resistor R9 and the tenth resistor R10 and the other end connected to the second ground G2. Like the first capacitor C1, the second capacitor C2 may be a bypass filter for removing noise.

For example, referring to FIG. 3, the second capacitor C2 may remove noise included in a signal flowing to the second input terminal IN2 of the control unit 140 through the second diagnosing unit 130. That is, the noise passing through the second capacitor C2 may flow to the second ground G2.

Since the apparatus 100 for diagnosing an insulation resistance measurement circuit according to the present disclosure may further include the first capacitor C1 and the second capacitor C2, it is possible to remove a noise component from a signal received from the control unit 140. Therefore, since the noise component is removed from the estimated voltage value calculated by the control unit 140, the state of the insulation resistance measurement circuit may be diagnosed more accurately.

The control unit 140 may be configured to estimate a positive electrode voltage value of the battery module 10 based on the first voltage value, the resistance of the plurality of first diagnosis resistors, and the resistance of the first switch S1.

Preferably, the resistances of the plurality of first diagnosis resistors and the first switch S1 may be stored in the storage unit 150 in advance. In addition, the control unit 140 may estimate the positive electrode voltage value of the battery module 10 by referring to the resistances of the first switch S1 and the plurality of first diagnosis resistors stored in the storage unit 150.

For example, the control unit 140 may estimate the positive electrode voltage value of the battery module 10 using Equation 1 below.

$$Vp = \left(\frac{V1}{R4 + R5}\right) \times (R1 + R2 + RS1) + V1 \qquad \text{[Equation 1]}$$

Here, Vp is the estimated positive electrode voltage value, R1, R2, R4 and R5 are the resistances of the first resistor R1, the second resistor R2, the fourth resistor R4 and the fifth resistor R5, respectively, RS1 is the resistance of the first switch S1, and V1 is the first voltage value calculated by the control unit 140 based on the signal input to the first input terminal IN1.

That is, the control unit 140 may estimate the positive electrode voltage value of the battery module 10 using the calculated first voltage value and the resistances of the first resistor R1, the second resistor R2, the fourth resistor R4, the fifth resistor R5 and the first switch S1 stored in the storage unit 150. Preferably, the positive electrode voltage value (Vp) estimated using Equation 1 may be a positive electrode voltage value estimated based on a voltage distribution resistance of the first diagnosing unit 120.

In addition, the control unit 140 may be configured to estimate a negative electrode voltage value of the battery module 10 based on the voltage value supplied from the power supply unit DC, the second voltage value, the resistance of the plurality of second diagnosis resistors and the resistance of the second switch S2.

Preferably, the voltage value supplied from the power supply unit DC may be set in advance, and the set voltage value may be stored in the storage unit 150. In addition, the resistance of the plurality of second diagnosis resistors and the resistance of the second switch S2 may be stored in the storage unit 150 in advance. The control unit 140 may estimate the negative electrode voltage value of the battery module 10 by referring to the voltage value supplied from the power supply unit DC, the resistance of the plurality of second diagnosis resistors and the resistance of the second switch S2, which are stored in the storage unit 150.

For example, the control unit 140 may estimate the negative electrode voltage value of the battery module 10 using Equation 2 below.

$$Vn = \left(\frac{VDC - V2}{R9 + R10}\right) \times (R6 + R7 + RS2) - V2 \qquad \text{[Equation 2]}$$

Here, Vn is the estimated negative electrode voltage value, R6, R7, R9 and R10 are the resistances of the sixth resistor R6, the seventh resistor R7, the ninth resistor R9 and the tenth resistor R10 included in the plurality of second diagnosis resistors, respectively, RS2 is the resistance of the second switch S2, VDC is the voltage value supplied from the power supply unit DC, and V2 is the second voltage value calculated by the control unit 140 based on the signal input to the second input terminal IN2.

That is, the control unit 140 may estimate the negative electrode voltage value of the battery module 10 by using the calculated second voltage value, the resistances of the sixth resistor R6, the seventh resistor R7, the ninth resistor R9, the tenth resistor R10 and the second switch S2 stored in the storage unit 150, and the voltage value supplied from the power supply unit DC. Preferably, the negative electrode voltage value (Vn) estimated using Equation 2 may be a negative electrode voltage value estimated based on a voltage distribution resistance of the second diagnosing unit 130.

Also, the control unit 140 may be configured to calculate the estimated voltage value by adding the estimated positive electrode voltage value (Vp) and the estimated negative electrode voltage value (Vn).

In addition, the control unit 140 may diagnose the states of the first diagnosing unit 120 and the second diagnosing unit 130 by using the calculated estimated voltage value and the measured voltage value measured by the measuring unit 110.

The apparatus 100 for diagnosing an insulation resistance measurement circuit does not diagnose the state of the insulation resistance measurement circuit using only the measured voltage value or the estimated voltage value, but may diagnose the state of the insulation resistance measurement circuit using both the measured voltage value and the estimated voltage value. Therefore, the state of the insulation resistance measurement circuit may be diagnosed more accurately.

The voltage ratio is a ratio of the estimated voltage value to the measured voltage value, and may be calculated using Equation 3 below.

$$ROV = \frac{Vp + Vn}{Bv} \qquad \text{[Equation 3]}$$

Here, ROV is the voltage ratio, Bv is the measured voltage value of the battery module 10 measured by the measuring unit 110, Vp is the positive electrode voltage value estimated using Equation 1, and Vn is the negative electrode voltage value estimated using Equation 2.

That is, the voltage ratio (ROV) may be a ratio of the estimated voltage value (Vp+Vn) to the measured voltage value (Bv) of the battery module 10. Specifically, the voltage ratio (ROV) may be a ratio of the estimated voltage value estimated based on the voltage distribution resistance of the first diagnosing unit 120 and the second diagnosing unit 130 to the measured voltage value (Bv) of the battery module 10.

Meanwhile, the positive electrode voltage value (Vp) estimated using Equation 1 and the negative electrode voltage value (Vn) estimated using Equation 2 do not mean the positive electrode voltage and the negative electrode voltage of the battery module 10, respectively. That is, the difference between the estimated positive electrode voltage value (Vp) and the estimated negative electrode voltage value (Vn) does not refer to a potential difference between the voltages at both terminals of the battery module 10, but the sum of the estimated positive electrode voltage value (Vp) and the estimated negative electrode voltage value (Vn) is the potential difference between the voltages at both terminals of the battery module 10.

The control unit 140 may diagnose the states of the first diagnosing unit 120 and the second diagnosing unit 130 using the voltage ratio calculated using Equation 3.

That is, the control unit 140 may diagnose the states of the first diagnosing unit 120 and the second diagnosing unit 130 using the ratio of the estimated voltage value and the measured voltage value, rather than diagnosing using only the estimated voltage value. Therefore, there is an advantage in that the states of the first diagnosing unit 120 and the second diagnosing unit 130 may be accurately diagnosed when at least one of the plurality of resistors included in the first diagnosing unit 120 and the second diagnosing unit 130 is not only in an open circuit state but also in a short circuit state.

Hereinafter, a limitation in diagnosing the states of the first diagnosing unit 120 and the second diagnosing unit 130 using only whether the first voltage value and the second voltage value are calculated will be described with reference to FIG. 4.

Figure 4:
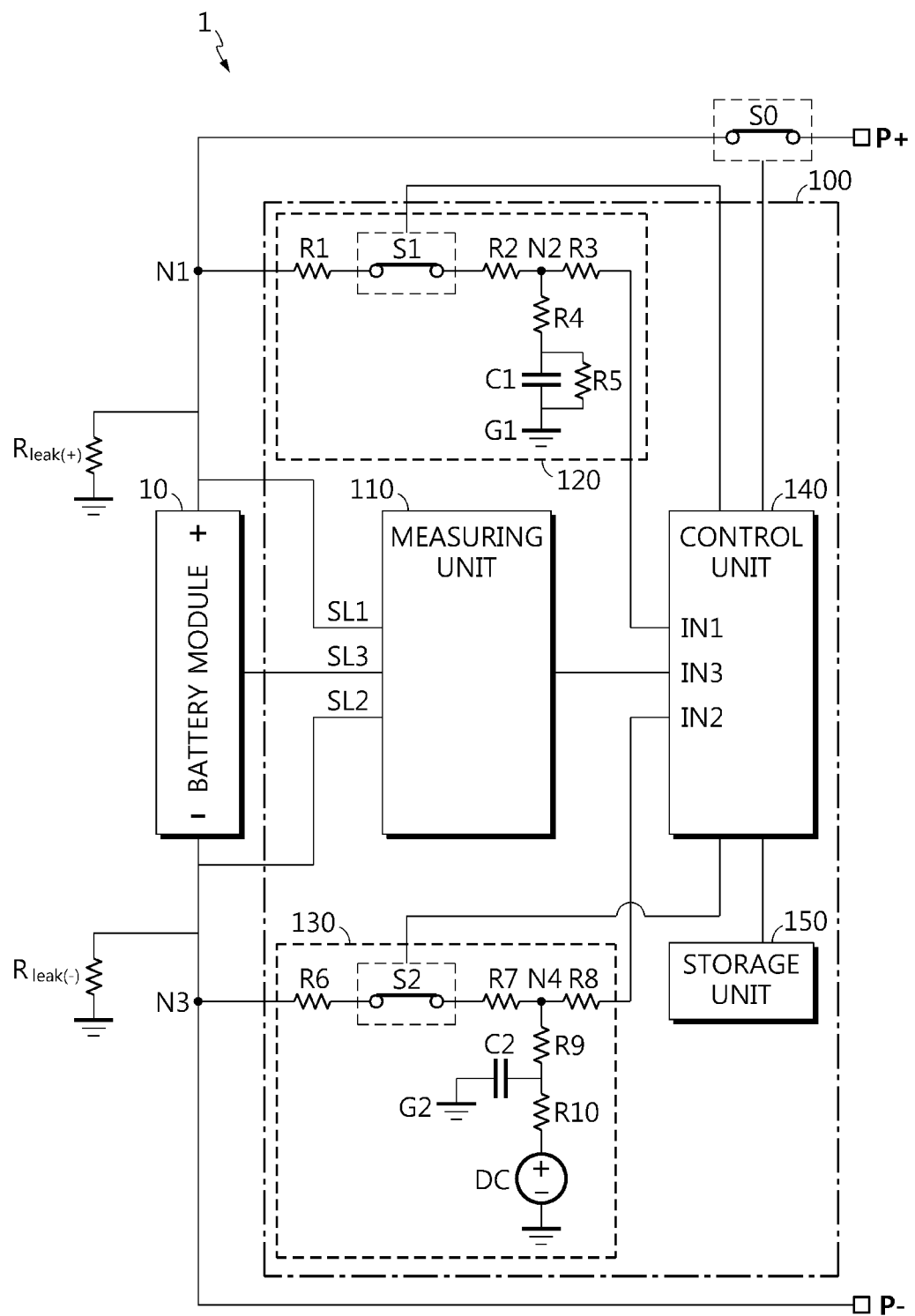
FIG. 4 is a diagram schematically showing a first operation state of the battery pack including the apparatus for diagnosing an insulation resistance measurement circuit according to another embodiment of the present disclosure.

FIG. 4 is a diagram schematically showing a first operation state of the battery pack 1 including the apparatus 100 for diagnosing an insulation resistance measurement circuit according to another embodiment of the present disclosure.

Specifically, FIG. 4 is a diagram schematically showing an operation state in which the insulation resistance measurement circuit is diagnosed. That is, in the first operation state, the control unit 140 sends a turn-on command to the first switch S1, the second switch S2 and the main switch S0 to control the first switch S1, the second switch S2 and the main switch S0 to a turn-on state.

The control unit 140 may calculate the first voltage value based on the signal input through the first input terminal IN1, and calculate the second voltage value based on the signal input through the second input terminal IN2.

For example, it is assumed that the resistance of the first resistor R1 is 1 [GΩ], which is the case where the first resistor R1 is in an open circuit state. In this case, the control unit 140 may calculate the first voltage value as a value close to 0. In this case, since the calculated first voltage value is close to 0, the control unit 140 may diagnose that at least one of the plurality of first diagnosis resistors provided in the first diagnosing unit 120 is in an open circuit state.

As another example, it is assumed that the resistance of the first resistor R1 is 0 [Ω], which is the case where the first resistor R1 is in a short circuit state. In this case, the first voltage value and the second voltage value may be different from the voltage value when the state of the first resistor R1 is a normal state. The first voltage value and the second voltage value may be larger or smaller than the voltage value when the state of the first resistor R1 is the normal state. In other words, from the point of view of the overall circuit, the battery module 10, the first diagnosing unit 120, the second diagnosing unit 130 and the control unit 140 form one path, so if the state of a resistor provided in the first diagnosing unit 120 is a failure state, not only the first voltage value but also the second voltage value may be affected therefrom.

In this case, since both the first voltage value and the second voltage value are calculated as a value greater than 0, the control unit 140 may determine the states of the first diagnosing unit 120 and the second diagnosing unit 130 as a normal state. That is, the control unit 140 may not diagnose that at least one of the plurality of resistors provided in the first diagnosing unit 120 and/or the second diagnosing unit 130 is in a short circuit state by using only whether the first voltage value and the second voltage value are calculated.

Meanwhile, since the control unit 140 according to the present disclosure calculates the voltage ratio between the measured voltage value and the estimated voltage value, if the voltage ratio calculated when the first resistor R1 is in a short circuit state is different from the reference ratio, the insulation resistance measurement circuit may be diagnosed as being not in a normal state.

Therefore, the apparatus 100 for diagnosing an insulation resistance measurement circuit according to the present disclosure may accurately diagnose whether the insulation resistance measurement circuit is in a failure state, even when at least one of the plurality of resistors belonging to the insulation resistance measurement circuit is in a short circuit state.

The control unit 140 may be configured to set the reference ratio as a predetermined ratio range in advance.

If the control unit 140 calculates the voltage ratio using Equation 3, the reference ratio may be set based on 1. For example, the reference ratio may be set in advance as a ratio range of 0.5 to 1.5. More preferably, the reference ratio may be set in advance as a ratio range of 0.9 to 1.1. The set reference ratio may be stored in the storage unit 150.

That is, when the control unit 140 diagnoses the states of the first diagnosing unit 120 and the second diagnosing unit 130 using the calculated voltage ratio, the reference ratio may be set as a predetermined ratio range in advance in consideration of an error during the voltage ratio calculating process.

The control unit 140 may be configured to diagnose the state of the insulation resistance measurement circuit as a failure state if the calculated voltage ratio does not belong to the predetermined ratio range. Conversely, if the calculated voltage ratio belongs to the predetermined ratio range, the control unit 140 may diagnose the state of the insulation resistance measurement circuit as a normal state.

In addition, if the state of the insulation resistance measurement circuit is determined as a failure state, the control unit 140 may be configured to output a diagnostic trouble code (DTC) corresponding to the failure state.

For example, if the apparatus 100 for diagnosing an insulation resistance measurement circuit according to the present disclosure is provided to a vehicle, the control unit 140 may output the diagnostic trouble code corresponding to the failure state to an on-board diagnostics (OBD) of a vehicle, a display panel, or an external server for checking a condition of the vehicle. In this case, a user may check that the insulation resistance measurement circuit is in a failure state and perform vehicle inspection to prevent an accident caused by a failure of the insulation resistance measurement circuit.

Hereinafter, in the embodiment of FIG. 4, the operation of the control unit 140 according to the state of the first resistor R1 when the states of resistors other than the first resistor R1 are all normal states will be described.

For convenience of explanation, it is assumed that the voltage of the battery module 10 is 200 [V] and the predetermined ratio range is set as 0.9 to 1.1 in advance. That is, it is assumed that the reference ratio is set in advance as the range of 0.9 to 1.1.

<When the First Resistor R1 is in a Normal State>

If the first resistor R1 is in a normal state, the positive electrode voltage value (Vp) calculated using Equation 1 may be 102.497 [V], and the negative electrode voltage value (Vn) calculated using Equation 2 may be 97.503 [V]. That is, the estimated voltage value (Vp+Vn) may be 200 [V].

In this case, since the voltage ratio calculated using Equation 3 is 1, the calculated voltage ratio may belong to the predetermined ratio range.

Therefore, since the calculated voltage ratio of the control unit 140 belongs to the predetermined ratio range, both the first diagnosing unit 120 and the second diagnosing unit 130 may be diagnosed as being in a normal state.

<When the First Resistor R1 is in an Open Circuit State>

If the first resistor R1 is in an open circuit state, it is assumed that the resistance of the first resistor R1 is 1 [GΩ]. In this case, due to the influence of the power supply unit DC connected to the control unit 140, the first voltage value (V1) may be calculated as a value close to about 0 [V]. Also, the second voltage value (V2) may be calculated as a value close to about 5 [V] due to the influence of the power supply unit DC.

For example, the control unit 140 may calculate the positive electrode voltage value (Vp) as 121.981 [V] using Equation 1, and calculate the negative electrode voltage value (Vn) as 238.961 [V] using Equation 2. That is, the estimated voltage value (Vp+Vn) may be 360.942 [V].

In this case, since the voltage ratio calculated using Equation 3 is 1.805, the calculated voltage ratio may not belong to the predetermined ratio range.

Since the calculated voltage ratio does not belong to the predetermined ratio range, the control unit 140 may diagnose that at least one of the first diagnosing unit 120 and the second diagnosing unit 130 is in a failure state. In particular, since the first voltage value (V1) is calculated as a value close to 0 [V], the control unit 140 may diagnose the state of the first diagnosing unit 120 as a failure state. Preferably, the control unit 140 may diagnose that the first diagnosing unit 120 is in an open circuit state.

<When the First Resistor R1 is in a Short Circuit State>

If the first resistor R1 is in a short circuit state, it is assumed that the resistance of the first resistor R1 is 0 [Ω]. Therefore, the first voltage value (V1) and the second voltage value (V2) calculated in this case may be different from the first voltage value (V1) and the second voltage value (V2) when the first resistor R1 is in a normal state.

For example, the positive electrode voltage value (Vp) calculated using Equation 1 may be 82.008 [V], and the negative electrode voltage value (Vn) calculated using Equation 2 may be 77.010 [V]. That is, the estimated voltage value (Vp+Vn) may be 159.018 [V].

In this case, since the voltage ratio calculated using Equation 3 is 0.795, the calculated voltage ratio may not belong to the predetermined ratio range.

Since the calculated voltage ratio does not belong to the predetermined ratio range, the control unit 140 may diagnose that at least one of the first diagnosing unit 120 and the second diagnosing unit 130 is in a failure state. In particular, since the first voltage value (V1), the second voltage value (V2), the positive electrode voltage value (Vp) and the negative electrode voltage value (Vn) are not all close to 0, the control unit 140 may diagnose that at least one of the first diagnosing unit 120 and the second diagnosing unit 130 is in a failure state. Preferably, the control unit 140 may diagnose that at least one of the first diagnosing unit 120 and the second diagnosing unit 130 is in a short circuit state.

As described above, if the control unit 140 diagnoses that the first diagnosing unit 120 and/or the second diagnosing unit 130 is in a failure state, the control unit 140 outputs a diagnostic trouble code corresponding to the failure state to inform the failure state of the insulation resistance measurement circuit to the outside.

That is, the apparatus 100 for diagnosing an insulation resistance measurement circuit according to the present disclosure has an advantage of more flexibly and reasonably diagnosing the state of the insulation resistance measurement circuit by setting the reference ratio in consideration of an error during the voltage ratio calculation process.

In addition, if the insulation resistance measurement circuit is diagnosed as being in a failure state, the apparatus 100 for diagnosing an insulation resistance measurement circuit according to the present disclosure may prevent an additional accident caused by the insulation resistance measurement circuit in a failure state in advance by outputting the diagnostic trouble code.

Measuring unit 110 may be configured to measure a temperature of the battery module 10.

Preferably, the measuring unit 110 may include a temperature sensor to measure the temperature as well as the voltage of the battery module 10.

In the embodiment of FIGS. 2 and 3, the measuring unit 110 may measure the temperature of the battery module 10 through a third sensing line SL3.

The control unit 140 may be configured to change the predetermined ratio range based on the temperature of the battery module 10 measured by the measuring unit 110. Preferably, the control unit 140 may change the size of the predetermined ratio range based on the measured temperature of the battery module 10.

For example, the storage unit 150 may store a temperature-ratio lookup table indicating a correspondence relationship between the temperature of the battery module 10 and the predetermined ratio range. The control unit 140 may change the predetermined ratio range to a ratio range corresponding to the temperature of battery module 10 measured by the measuring unit 110 by referring to the temperature-ratio lookup table stored in the storage unit 150.

As another example, a reference temperature corresponding to the predetermined ratio range may be set in advance. The control unit 140 may compare the temperature of the battery module 10 measured by the measuring unit 110 with the reference temperature, and change the predetermined ratio range as much as a difference between the measured temperature of the battery module 10 and the reference temperature.

If the temperature of the battery module 10 rises so that the temperature of the battery pack 1 including the battery module 10 and the apparatus 100 for diagnosing an insulation resistance measurement circuit rises, elements of the insulation resistance measurement circuit may be affected therefrom. For example, since the resistors and the switches provided in the insulation resistance measurement circuit are physical elements, the physical properties of the elements may be affected by the temperature of the battery module 10. Therefore, the control unit 140 may minimize the influence of the temperature of the battery module 10 on the physical elements such as resistors and switches by changing the predetermined ratio range based on the temperature of the battery module 10.

That is, the apparatus 100 for diagnosing an insulation resistance measurement circuit according to the present disclosure has an advantage of more accurately diagnosing the states of the first diagnosing unit 120 and the second diagnosing unit 130 by changing the predetermined ratio range according to the temperature of the battery module 10.

The control unit 140 may be configured to increase the size of the predetermined ratio range if the measured temperature of the battery module 10 is higher than an upper temperature limit. In addition, the control unit 140 may be configured to reduce the size of the predetermined ratio range if the measured temperature of the battery module 10 is lower than a lower temperature limit.

For example, if an ambient temperature rises, the resistance of a resistor element may increase since its resistor coefficient increases. If the resistance of the plurality of first diagnosis resistors included in the first diagnosing unit 120 increases, the first voltage value (V1) and second voltage value (V2) calculated by the control unit 140 may become smaller compared to the case where the temperature of the battery module 10 is the reference temperature. This is because the resistor coefficient of each of the plurality of first diagnosis resistors increases and thus the resistance of the plurality of first diagnosis resistors increases.

As a result, since the estimated voltage value becomes smaller, even if the plurality of first diagnosis resistors are in a normal state, the voltage ratio calculated by the control unit 140 may become smaller compared to the case where the temperature of the battery module 10 is the reference temperature.

That is, since the resistor coefficient is related to the ambient temperature, the control unit 140 may increase the size of the predetermined ratio range as the temperature of the battery module 10 rises, in order to compensate for the influence of the temperature of the battery module 10 on the surrounding.

Hereinafter, the effect of the temperature of the battery module 10 on the diagnosis of the insulation resistance measurement circuit will be described based on an example.

For example, it is assumed that the predetermined ratio range is set as 0.9 to 1.1, and the estimated voltage value is 180 [V] and the measured voltage value is 200 [V] when the temperature of the battery module 10 is 30° C. That is, when the temperature of the battery module 10 is 30° C., the voltage ratio calculated by the control unit 140 is 0.9.

After that, if the voltage of the battery module 10 is maintained constantly and the temperature rises to 60° C., the states of the plurality of resistors included in the first diagnosing unit 120 and the second diagnosing unit 130 are a normal state, but the resistance may be increased for all of them. Therefore, the first voltage value and the second voltage value may be decreased compared to the case where the temperature of the battery module 10 is 30° C.

That is, seeing Equations 1 and 2, since the first voltage value (V1) and the second voltage value (V2) are values calculated by the control unit 140, they may decrease as the temperature of the battery module 10 rises. However, other values are not measured values but are preset values to estimate the positive electrode voltage value (Vp) and the negative electrode voltage value (Vn), and thus may always be constant regardless of a current temperature of the battery module 10. Therefore, if the temperature of the battery module 10 rises to 60° C., the estimated positive electrode voltage value (Vp) and the estimated negative electrode voltage value (Vn) inevitably decrease.

Seeing Equation 3, when the temperature of the battery module 10 is 60° C., the positive electrode voltage value (Vp) and the negative electrode voltage value (Vn) decrease, so the sum of them, namely the estimated voltage value (Vp+Vn), is also inevitably small. In addition, even though the measured voltage value (Bv) is kept constantly when the temperature of the battery module 10 is 30° C. and 60° C., the size of the estimated voltage value (Vp+Vn) decreases, so the calculated voltage ratio is inevitably lowered.

Therefore, the voltage ratio calculated as 0.9 when the temperature of the battery module 10 is 30° C. will be calculated as being less than 0.9 when the temperature of the battery module 10 is 60° C., and since the predetermined ratio range is set as 0.9 to 1.1, the control unit 140 may diagnose the state of the first diagnosing unit 120 and/or the second diagnosing unit 130 as a failure state.

As described above, even in a situation in which any one of the plurality of resistors belonging to the first diagnosing unit 120 and the second diagnosing unit 130 has no failure, the state of the insulation resistance measurement circuit may be incorrectly diagnosed because the temperature of the battery module 10 rises.

Meanwhile, according to the present disclosure, when the temperature of the battery module 10 rises, the size of the predetermined ratio range may also increase correspondingly. Therefore, even if the voltage ratio is calculated to be less than 0.9, the control unit 140 may diagnose the state of the first diagnosing unit 120 and/or the second diagnosing unit 130 as a normal state.

Therefore, the apparatus 100 for diagnosing an insulation resistance measurement circuit according to the present disclosure has an advantage of more accurately diagnosing the state of the insulation resistance measurement circuit by changing the predetermined ratio range in consideration of the temperature of the battery module 10.

In addition, the control unit 140 may be configured to estimate a state of charge (SOC) of the battery module 10.

Specifically, the storage unit 150 may further store a voltage-SOC lookup table to which voltage and SOC of the battery module 10 are mapped. Here, the voltage-SOC lookup table may be a table configured to indicate a correspondence relationship between voltage and SOC of the battery module 10. In general, since voltage and SOC of the battery module 10 are in a one-to-one relationship with each other, the control unit 140 may estimate the SOC of the battery module 10 by referring to the voltage-SOC lookup table stored in the storage unit 150.

For example, the control unit 140 may receive voltage information of the battery module 10 from the measuring unit 110 through the third input terminal IN3. In addition, the control unit 140 may select an SOC corresponding to the received voltage information by referring to the voltage-SOC lookup table stored in the storage unit 150. The control unit 140 may estimate the selected SOC as an SOC of the battery module 10.

In addition, the control unit 140 may be configured to change the predetermined ratio range based on the estimated SOC.

Specifically, if the SOC of the battery module 10 is lowered below a predetermined lower limit, the battery pack 1 including the battery module 10 having at least one battery cell may reduce the amount of discharge current to prevent overdischarge of the battery module 10. That is, if the SOC of the battery module 10 is lowered below the predetermined lower limit, a discharge C-rate may be reduced.

If the discharge C-rate is decreased, the amount of current output from the battery module 10 decreases, so the first voltage value and the second voltage value calculated by the control unit 140 may also be decreased. The change in the first voltage value and the second voltage value may affect the estimated voltage value, and the change in the estimated voltage value may affect the diagnosis on the state of the insulation resistance measurement circuit. Therefore, if the SOC of the battery module 10 is estimated to be less than the predetermined lower limit, the control unit 140 may change the size of the predetermined ratio range to improve the accuracy of diagnosis on the state of the insulation resistance measurement circuit.

Preferably, if the SOC of the battery module 10 is estimated to be less than the predetermined lower limit, the control unit 140 may increase the size of the predetermined ratio range to minimize the influence of the change of the discharge C-rate on the diagnosis on the state of the insulation resistance measurement circuit.

Therefore, since the apparatus 100 for diagnosing an insulation resistance measurement circuit according to the present disclosure diagnoses the state of the insulation resistance measurement circuit in consideration of the SOC of the battery module 10, the accuracy of the state diagnosis may be improved.

Meanwhile, the storage unit 150 may further store a voltage-temperature-SOC lookup table to which voltage, temperature and SOC of the battery module 10 are mapped. That is, the voltage-temperature-SOC lookup table may store a SOC corresponding to voltage and temperature of the battery module 10.

The control unit 140 may estimate the SOC of the battery module 10 corresponding to the temperature and voltage information of the battery module 10 received from the measuring unit 110 by referring to the voltage-temperature-SOC lookup table stored in the storage unit 150. In this case, since the SOC of battery module 10 may be estimated in consideration of temperature as well as voltage, the accuracy of estimation on the SOC of the battery module 10 may be improved.

In addition, since the predetermined ratio range is changed based on the SOC of the battery module 10, the accuracy and reliability of diagnosis on the state of the insulation resistance measurement circuit may be further improved. Also, since the apparatus 100 for diagnosing an insulation resistance measurement circuit outputs the diagnostic trouble code to take an appropriate diagnostic measure with improved accuracy, it is possible to further improve the safety of the battery pack 1.

After outputting the diagnostic trouble code, the control unit 140 may be configured to block the connection of the battery module 10 by sending a turn-off command to the main switch S0 provided on a charging and discharging path of the battery module 10.

Figure 5:
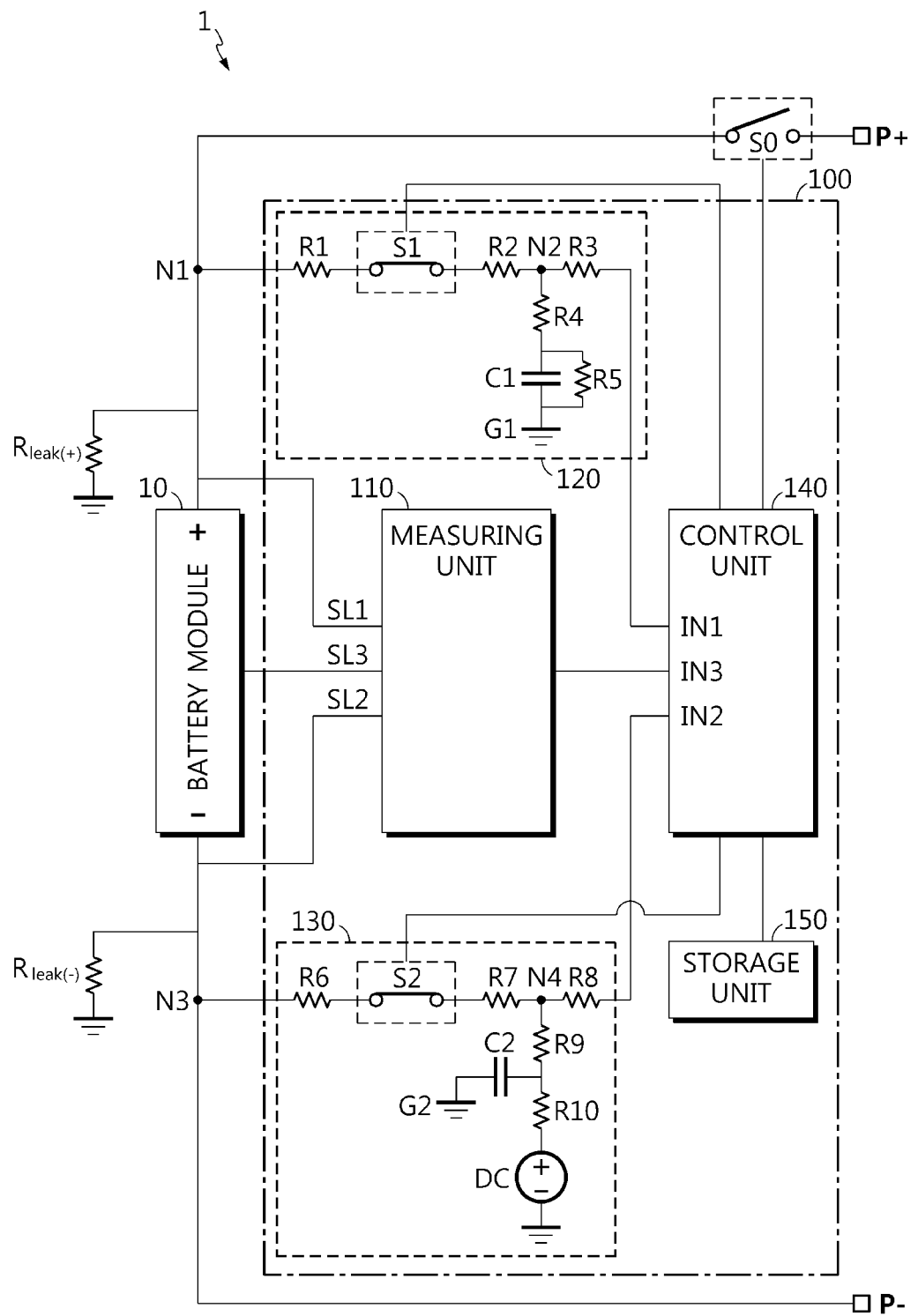
FIG. 5 is a diagram schematically showing a second operation state of the battery pack including the apparatus for diagnosing an insulation resistance measurement circuit according to another embodiment of the present disclosure.

FIG. 5 is a diagram schematically showing a second operation state of the battery pack 1 including the apparatus 100 for diagnosing an insulation resistance measurement circuit according to another embodiment of the present disclosure.

Referring to FIG. 5, after outputting the diagnostic trouble code, the control unit 140 may send a turn-off command to the main switch S0 to control the operation state of the main switch S0 to a turn-off state. That is, the second operation state is a state in which the control unit 140 sends a turn-off command to the main switch S0 and the main switch S0 is controlled to a turn-off state.

Therefore, if at least one of the first diagnosing unit 120 and the second diagnosing unit 130 is diagnosed as being in a failure state, the operation of the battery pack 1 may be stopped as a diagnostic measure by the control unit 140. In other words, since the control unit 140 takes this diagnostic measure after outputting the diagnostic trouble code, the operation of the battery pack 1 including the insulation resistance measurement circuit in a failure state is stopped, thereby preventing accidents related to abnormal insulation of the battery module 10 in advance.

The apparatus 100 for diagnosing an insulation resistance measurement circuit according to the present disclosure has an advantage of preventing unexpected accidents in advance by taking an immediate measure by the control unit 140.

Meanwhile, after outputting the diagnostic trouble code to the outside, the control unit 140 may be configured to send a turn-off command to the main switch S0 only when receiving a main switch S0 turn-off command from the outside.

For example, it is assumed that the battery pack 1 including the apparatus 100 for diagnosing an insulation resistance measurement circuit is provided to a vehicle and the vehicle is running. In this case, in order to prevent the operation of the battery pack 1 from being interrupted, the control unit 140 may output the diagnostic trouble code and then send a turn-off command to the main switch S0 only when receiving the main switch S0 turn-off command from the outside.

That is, the apparatus 100 for diagnosing an insulation resistance measurement circuit according to the present disclosure has an advantage of stopping the operation of the battery pack 1 more safely by taking an appropriate measure to the insulation resistance measurement circuit according to an external command. In addition, according to this measure, since the operation of the battery pack 1 is stopped, an accident caused by the battery pack 1 in which the insulation resistance measurement circuit is in a failure state may be prevented in advance.

The apparatus 100 for diagnosing an insulation resistance measurement circuit according to the present disclosure may be applied to a battery management system (BMS). That is, the BMS according to the present disclosure may include the apparatus 100 for diagnosing an insulation resistance measurement circuit according to the present disclosure described above. In this configuration, at least some components of the apparatus 100 for diagnosing an insulation resistance measurement circuit according to the present disclosure may be implemented by supplementing or adding functions of components included in the conventional BMS. For example, the measuring unit 110, the control unit 140 and the storage unit 150 of the apparatus 100 for diagnosing an insulation resistance measurement circuit according to the present disclosure may be implemented as components of the BMS.

In addition, the apparatus 100 for diagnosing an insulation resistance measurement circuit according to the present disclosure may be provided to the battery pack 1. That is, the battery pack 1 according to the present disclosure may include the apparatus 100 for diagnosing an insulation resistance measurement circuit according to the present disclosure described above. Here, the battery pack 1 may include at least one battery cell, the apparatus 100 for diagnosing an insulation resistance measurement circuit, electrical equipment (such as a BMS, a relay, a fuse, or the like), and a case.

Figure 6:
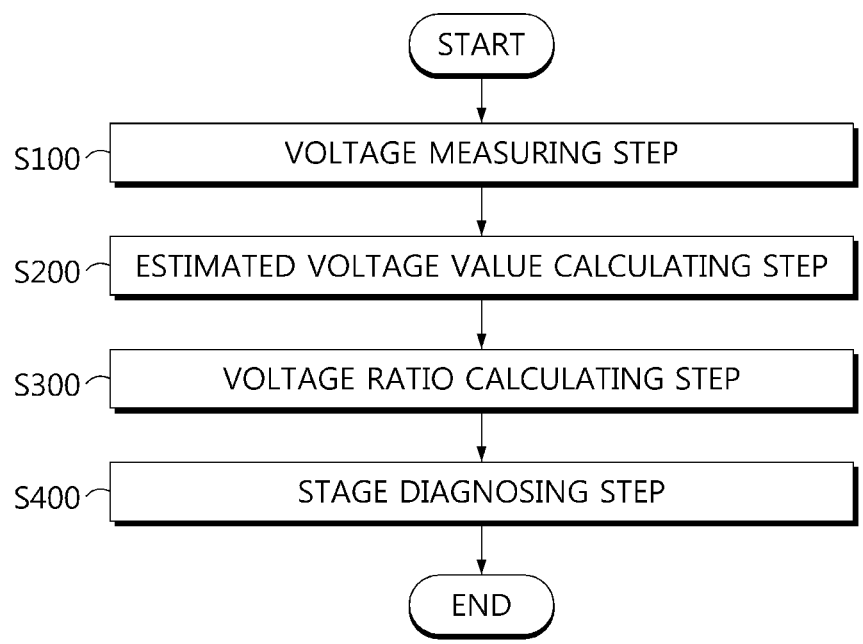
FIG. 6 is a diagram schematically showing a method for diagnosing an insulation resistance measurement circuit according to another embodiment of the present disclosure.

FIG. 6 is a diagram schematically showing a method for diagnosing an insulation resistance measurement circuit according to another embodiment of the present disclosure. Here, the method for diagnosing an insulation resistance measurement circuit may be performed at each component of the apparatus 100 for diagnosing an insulation resistance measurement circuit according to an embodiment of the present disclosure.

Referring to FIG. 6, the method for diagnosing an insulation resistance measurement circuit may include a voltage measuring step (S100), an estimated voltage value calculating step (S200), a voltage ratio calculating step (S300), and a state diagnosing step (S400).

The voltage measuring step (S100) is a step of measuring the voltage of the battery module 10 having at least one battery cell, and may be performed by the measuring unit 110.

For example, referring to FIGS. 2 and 3, the measuring unit 110 may measure the positive electrode voltage of the battery module 10 through the first sensing line SL1 and measure the negative electrode voltage of the battery module 10 through the second sensing line SL2.

In addition, the measuring unit 110 may measure the voltage of the battery module 10 by obtaining a difference between the positive electrode voltage and the negative electrode voltage. Also, the measuring unit 110 may transmit the measured voltage of the battery module 10 to the third input terminal IN3 of the control unit 140.

The estimated voltage value calculating step (S200) is a step of calculating the estimated voltage value by using the first voltage value calculated based on the signal received from the first diagnosing unit 120 and the second voltage value calculated based on the signal received from the second diagnosing unit 130, and may be performed by the control unit 140.

In the embodiment of FIGS. 2 and 3, the control unit 140 may calculate the first voltage value of the battery module 10 based on the signal input to the first input terminal IN1 through the first diagnosing unit 120. Similarly, the control unit 140 may calculate the second voltage value of the battery module 10 based on the signal input to the second input terminal IN2 through the second diagnosing unit 130.

The control unit 140 may estimate the positive electrode voltage value of the battery module 10 based on the first voltage value using Equation 1. Also, the control unit 140 may estimate the negative electrode voltage value of the battery module 10 based on the second voltage value using Equation 2.

Finally, the control unit 140 may calculate the estimated voltage value of the battery module 10 by adding the estimated positive electrode voltage value and the estimated negative electrode voltage value.

The voltage ratio calculating step (S300) is a step of calculating a voltage ratio between the estimated voltage value and the measured voltage value of the battery module 10 measured in the voltage measuring step (S100), and may be performed by the control unit 140.

The control unit 140 may calculate the voltage ratio by putting the positive electrode voltage value and the negative electrode voltage value of the battery module 10 calculated in the estimated voltage value calculating step (S200) and the measured voltage value of the battery module 10 measured by the measuring unit 110 in the voltage measuring step (S100) to Equation 3.

That is, the control unit 140 may calculate the ratio of the estimated voltage value to the measured voltage value of the battery module 10 by using Equation 3.

The state diagnosing step (S400) is a step of diagnosing the state of the insulation resistance measurement circuit according to the comparison result of the voltage ratio calculated in the voltage ratio calculating step (S300) and the reference ratio, and may be performed by the control unit 140.

The control unit 140 may diagnose the state of the insulation resistance measurement circuit, namely the first diagnosing unit 120 and the second diagnosing unit 130, by comparing the preset reference ratio with the voltage ratio calculated in the voltage ratio calculating step (S300).

For example, if the reference ratio is set as a predetermined ratio range, the control unit 140 may diagnose the states of the first diagnosing unit 120 and the second diagnosing unit 130 according to whether the calculated voltage ratio belongs to the predetermined ratio range.

Preferably, the control unit 140 may change the size of the predetermined ratio range in consideration of the state of the battery module 10.

For example, the control unit 140 may change the size of the predetermined ratio range in consideration of at least one of the temperature and SOC of the battery module 10. In this case, since the state of the battery module 10 is considered, there is an advantage that the states of the first diagnosing unit 120 and the second diagnosing unit 130 may be diagnosed more accurately by the control unit 140.

The embodiments of the present disclosure described above are not necessarily implemented by an apparatus and method but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
10: battery module
100: apparatus for diagnosing an insulation resistance measurement circuit
110: measuring unit
120: first diagnosing unit
130: second diagnosing unit
140: control unit
150: storage unit $R_{leak}(+)$: first insulation resistor
$R_{leak(-)}$: second insulation resistor
R1 to R10: first to tenth resistors
SL1, SL2 and SL3: first to third sensing lines
N1 to N4: first to fourth nodes
C1 and C2: first and second capacitors
S0: main switch
S1 and S2: first and second switches
G1 and G2: first and second grounds
DC: power supply unit
IN1 to IN3: first to third input terminals

What is claimed is:

1. An apparatus for diagnosing an insulation resistance measurement circuit, comprising:
    a voltage sensor configured to measure a voltage of a battery module having at least one battery cell;
    a first diagnosing circuit connected to a positive electrode terminal of the battery module and configured to include a plurality of first diagnosis resistors and a first switch, wherein the first diagnosing circuit is configured to measure a first insulation resistance on a positive side of the battery module, wherein the first insulation resistance is indicative of leakage current on the positive side of the battery;
    a second diagnosing circuit connected to a negative electrode terminal of the battery module and configured to include a plurality of second diagnosis resistors, a second switch and a power supply, wherein the second diagnosing circuit is configured to measure a second insulation resistance on a negative side of the battery module, wherein the second insulation resistance is indicative of leakage current on the negative side of the battery; and
    a control unit configured to:
        calculate an estimated voltage value of the battery module based on a first voltage value calculated based on a first signal received from the first diagnosing circuit and a second voltage value calculated based on a second signal received from the second diagnosing circuit,
        calculate a voltage ratio between the calculated estimated voltage value and the voltage of the battery module measured by the voltage sensor,
        compare the calculated voltage ratio to a reference ratio,
        diagnose a state of the insulation resistance measurement circuit of the battery module according to the comparison of the calculated voltage ratio to the reference ratio, and
        control a connection of the battery module along a charging and discharging path of the battery module based on the diagnosis,
        wherein the control unit is configured to set the reference ratio as a predetermined ratio range, diagnose the state of the insulation resistance measurement circuit as a failure state when the voltage ratio is not within the predetermined ratio range, and output a diagnostic trouble code corresponding to the failure state, and
    wherein after outputting the diagnostic trouble code, the control unit is configured to send a turn-off command to a main switch positioned on a charging and discharging path of the battery module to block a connection of the battery module.

2. The apparatus according to claim 1,
    wherein the plurality of first diagnosis resistors include:

a first resistor, a second resistor and a third resistor connected in series between the positive electrode terminal of the battery module and the control unit; and
a fourth resistor having a first end connected to a node between the second resistor and the third resistor and a second end connected to a first ground,
wherein the first switch is connected in series between the first resistor and the second resistor.

3. The apparatus according to claim 2,
wherein the plurality of second diagnosis resistors include:
a sixth resistor, a seventh resistor and an eighth resistor connected in series between the negative electrode terminal of the battery module and the control unit; and
a ninth resistor having a first end connected to a node between the seventh resistor and the eighth resistor and a second end connected to the power supply unit,
wherein the second switch is connected in series between the sixth resistor and the seventh resistor,
wherein the power supply has a first end connected to the ninth resistor and a second end connected to the ground.

4. The apparatus according to claim 3,
wherein the first diagnosing circuit further includes a first capacitor connected in series between the fourth resistor and the ground,
wherein the plurality of first diagnosis resistors further include a fifth resistor connected in parallel to the first capacitor,
wherein the plurality of second diagnosis resistors further include a tenth resistor positioned between the ninth resistor and the power supply and having a first end connected to the second end of the ninth resistor and a second end connected to the power supply, and
wherein the second diagnosing circuit further includes a second capacitor having a first end connected to a node between the ninth resistor and the tenth resistor and a second end connected to the ground.

5. The apparatus according to claim 1,
wherein the control unit is configured to:
estimate a positive electrode voltage value of the battery module based on the first voltage value, a resistance of the plurality of first diagnosis resistors and a resistance of the first switch,
estimate a negative electrode voltage value of the battery module based on a voltage value supplied from the power supply, the second voltage value, a resistance of the plurality of second diagnosis resistors and a resistance of the second switch, and
calculate the estimated voltage value by adding the estimated positive electrode voltage value and the estimated negative electrode voltage value.

6. The apparatus according to claim 5, wherein the voltage ratio is calculated using:

$$ROV = \frac{Vp + Vn}{Bv}$$

wherein ROV is the voltage ratio, Bv is the voltage of the battery module measured by the voltage sensor, Vp is the estimated positive electrode voltage value, and Vn is the estimated negative electrode voltage value.

7. The apparatus according to claim 1,
further comprising a temperature sensor configured to measure a temperature of the battery module, and
wherein the controller is configured to change the predetermined ratio range based on the temperature of the battery module measured by the temperature sensor.

8. The apparatus according to claim 7,
wherein the control unit is configured to:
increase a size of the predetermined ratio range in response to the measured temperature of the battery module being higher than an upper temperature limit, and
decrease the size of the predetermined ratio range in response to the measured temperature of the battery module being lower than a lower temperature limit.

9. The apparatus according to claim 1,
wherein the controller is configured to estimate a state of charge (SOC) of the battery module and change the predetermined ratio range based on the estimated SOC.

10. The apparatus according to claim 1,
wherein after outputting the diagnostic trouble code, the control unit is configured to send the turn-off command to the main switch only when receiving a main switch turn-off command from outside of the apparatus.

11. A battery pack, comprising the apparatus according to claim 1.

12. A method for diagnosing an insulation resistance measurement circuit, comprising:
measuring, by a voltage sensor, a voltage of a battery module having at least one battery cell;
calculating, by a control unit, an estimated voltage value based on a first voltage value calculated based on a first signal received from a first diagnosing circuit, and a second voltage value calculated based on a second signal received from a second diagnosing circuit, wherein the first diagnosing circuit is configured to measure a first insulation resistance on a positive side of the battery module, wherein the first insulation resistance is indicative of leakage current on the positive side of the battery, wherein the second diagnosing circuit is configured to measure a second insulation resistance on a negative side of the battery module, and wherein the second insulation resistance is indicative of leakage current on the negative side of the battery;
calculating, by the control unit, a voltage ratio between the calculated estimated voltage value and the measured voltage of the battery module;
comparing, by the control unit, the calculated voltage ratio to a reference ratio;
diagnosing, by the control unit, a state of the insulation resistance measurement circuit of the battery module according to the comparison result of the calculated voltage ratio to the reference ratio; and
controlling, by the control unit, a connection of the battery module along a charging and discharging path of the battery module based on the diagnosis,
wherein the method further includes:
setting, by the control unit, the reference ratio as a predetermined ratio range, diagnose the state of the insulation resistance measurement circuit as a failure state when the voltage ratio is not within the predetermined ratio range, and output a diagnostic trouble code corresponding to the failure state; and
after outputting the diagnostic trouble code, sending, by the control unit, a turn-off command to a main switch positioned on a charging and discharging path of the battery module to block a connection of the battery module.

* * * * *